(12) United States Patent
Wang et al.

(10) Patent No.: US 7,435,079 B2
(45) Date of Patent: Oct. 14, 2008

(54) ANGULAR EJECTOR MECHANISM AND INJECTION MOLD WITH THE SAME

(75) Inventors: Ching-Chang Wang, Tu-Cheng (TW); Chih-Yu Chen, Tu-Cheng (TW); Jian-Guang Huang, Tu-Cheng (TW); Yun-Chun He, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 280 days.

(21) Appl. No.: 11/405,613

(22) Filed: Apr. 18, 2006

(65) Prior Publication Data

US 2007/0243286 A1    Oct. 18, 2007

(51) Int. Cl.
*B29C 45/44* (2006.01)

(52) U.S. Cl. .............. 425/577; 425/556; 425/DIG. 58; 264/318; 264/334

(58) Field of Classification Search ............. 425/436 R, 425/577, DIG. 5, DIG. 58, 556; 264/318, 264/334
See application file for complete search history.

(56) References Cited

U.S. PATENT DOCUMENTS

| | | | | |
|---|---|---|---|---|
| 2,994,921 A * | 8/1961 | Hultgren | ..................... | 425/308 |
| 3,060,509 A * | 10/1962 | McCubbins, Jr. | ............ | 425/577 |
| 3,074,113 A * | 1/1963 | Specht | ........................ | 249/102 |
| 3,811,645 A * | 5/1974 | Feist | ............................ | 249/68 |
| 4,515,342 A * | 5/1985 | Boskovic | ..................... | 249/122 |
| 4,768,747 A * | 9/1988 | Williams et al. | .............. | 249/63 |
| 5,316,467 A * | 5/1994 | Starkey | ........................ | 425/438 |
| 5,498,387 A * | 3/1996 | Carter et al. | ................. | 264/219 |
| 6,235,231 B1 * | 5/2001 | Martin | ..................... | 264/328.1 |
| 7,121,823 B2 * | 10/2006 | Chen et al. | ................... | 425/438 |
| 7,175,421 B2 * | 2/2007 | Takemoto et al. | ........... | 425/577 |
| 2007/0172539 A1* | 7/2007 | Wang et al. | .................. | 425/577 |

* cited by examiner

*Primary Examiner*—Yogendra Gupta
*Assistant Examiner*—Emmanuel S Luk
(74) *Attorney, Agent, or Firm*—Birch, Stewart, Kolasch & Birch, LLP (57) ABSTRACT

An angular ejector mechanism for ejecting a plastic article with a recess in an inner side includes an angular ejector pin, a sliding pin, an elastic elements and a stopping block. The angular ejector pin includes a molding plate and a supporting plate. A moving hole and a sliding groove are respectively defined in a front face and an opposite rear face of the molding plate to communicate with each other. The sliding pin has a stopping protrusion dividing the sliding pin into a moving portion and a sliding portion. A sliding channel is defined on a front face of the stopping block. The sliding includes a vertical channel and a inclined channel. The moving portion is received in the moving hole of the molding plate, and the sliding portion slides from the sliding channel into the inclined channel until the angular ejector pin separates from the plastic article.

10 Claims, 12 Drawing Sheets

ANGULAR EJECTOR MECHANISM AND INJECTION MOLD WITH THE SAME

BACKGROUND OF THE INVENTION

1. Field of the Invention

The present invention relates to an angular ejector mechanism for ejecting plastic articles having a recess in inner sides, and also relates to an injection mold with the angular ejector mechanism capable of separating the plastic articles from the injection mold during mold opening cycle.

2. The Related Art

A conventional angular ejector pin in an injection mold is convenient for ejecting a plastic article molded in the injection mold. While mold opening, the angular ejector pin ejects the plastic article out from mold cavities of the injection mold. Then an ejector pin ejects the plastic article out from the injection mold, and meanwhile the plastic article is separated from the angular ejector pin. However, it is convenient for the angular ejector pin to eject a plastic article having a small dimension recess in inner sides, but it is difficult to eject the plastic article having a recess with a big dimension in inner sides.

Figure 13:
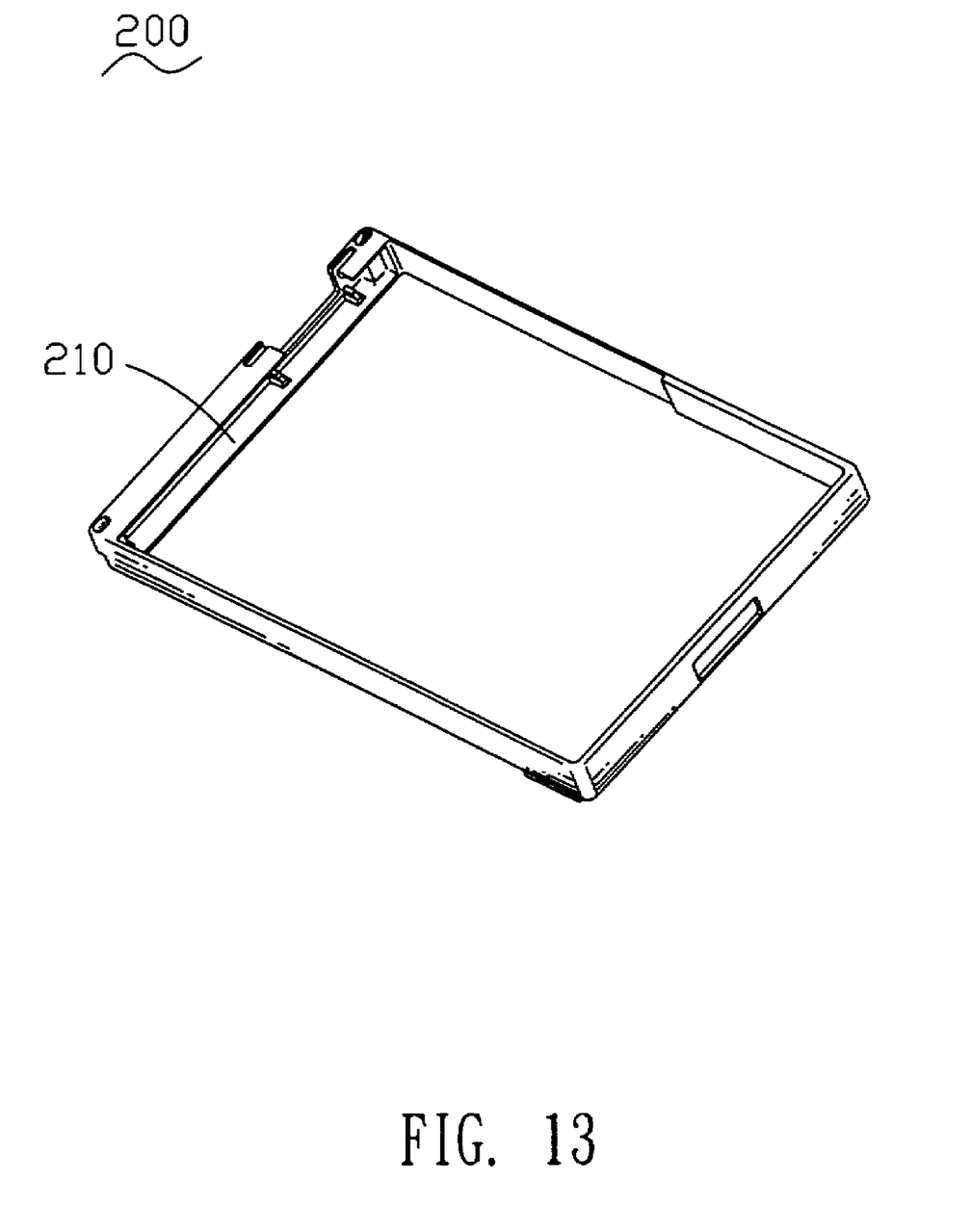
FIG. 13 is a perspective view of a plastic article with a big dimension recess in an inner side.

As shown in FIG. 13, a plastic article 200 has a recess 210 in an inner side, the recess 210 has a big dimension with complex constructions, and an angular ejector pin is tightly embedded in the recess 210 during molding procedure, thus there exists strong interference force between the plastic article 200 and the angular ejector pin. While the mold opening, the plastic article 200 moves following the ejecting movement of the angular ejector pin at an angle, but the plastic article 200 is not separated from the angular ejector pin. If the ejector pin directly ejects the plastic article 200, the plastic article 200 is so tightly matched with the angular ejector pin that the plastic article is easily damaged while the ejector pin ejects the plastic article, and it is time consuming to take the plastic article 200 off the angular ejector pin by hand, thus to increase the manufacture cost. Therefore, an angular ejector pin for convenient ejecting the plastic article 200 and separating from the plastic article while mold opening is required to solve the above problems.

SUMMARY OF THE INVENTION

It is therefore an object of the present invention to provide an angular ejector mechanism capable of ejecting a plastic article having a big dimension recess in an inner side.

It is another object of the present invention to provide an injection mold with the above angular ejector mechanism adapted to mold a plastic article with a big dimension recess and being capable of separating the plastic article conveniently from the injection mold.

To achieve the former object, An angular ejector pin mechanism for ejecting plastic articles having a recess in an inner side comprises an angular ejector pin, a sliding pin, an elastic elements and a stopping block. The angular ejector pin includes a horizontal molding plate and an inclined supporting plate slantingly extending downward from a portion of the molding plate. A moving hole is defined in a front face of the molding plate, and a sliding groove is defined in a rear face of the molding plate. The sliding groove extends forward to communicate with the moving hole. The sliding groove is coaxial with the moving hole and the diameters of the sliding groove being larger than the diameters of the moving holes. The sliding pin has a stopping protrusion so as to divide the sliding pin into a moving portion before the stopping protrusion and a sliding portion behind the stopping protrusion. The elastic element is assembled with the moving portion of the sliding pin, a portion of the elastic element abuts against the stopping protrusion and the other portion abuts against a front wall of the sliding groove. A sliding channel is defined in a front face of the stopping block and extends longitudinally. The sliding channel includes a vertical channel located at a lower portion of the sliding channel and a inclined channel extending slantingly relates to the vertical channel and located at an upper portion of the sliding channel. The moving portion of the sliding pin is received in the moving hole and the sliding portion abuts against an inner wall of the sliding channel to slide up and down. The stopping protrusion of the sliding pin moves along the sliding groove of the angular ejector pin.

To achieve the latter object of the present invention, an injection mold is mounted with the above angular ejector mechanism for molding plastic article with a recess in an inner side and ejecting the plastic article out from the injection mold. The injection mold further comprises a cavity plate, a core plate, an upper ejector plate and a lower ejector plate. A cavity insert is disposed in the cavity plate and a core insert is disposed in the core plate. The moving portion of the sliding pin is received in the moving hole and the sliding portion abuts against an inner wall of the sliding channel to slide up and down. The stopping protrusion of the sliding pin moves along the sliding groove of the angular ejector pin. The supporting plate slantingly passes through the core insert and core plate to be mounted in the upper and lower ejector plates. The cavity plate and core plate are closed together to define a mold cavity for molding the plastic article. A front portion of the molding plate of the angular ejector pin is dispose in the mold cavity to mold the recess in inner side of the plastic article. The angular ejector pin moves up and down following the ejecting movement of the upper and lower plates to eject the plastic article while the while the cavity plate and core plate opening.

As described above, while the angular ejector pin ejecting the plastic article, the sliding pin slides in the vertical channel to force the angular ejector pin separate from the plastic article, then the sliding pin slides in the inclined channel, the angular ejector pin is completely separated from the plastic article and the elastic element exerts elastic force on the sliding pin to force the moving portion of the sliding pin exit the recess of the plastic article, thus the plastic article is not interfered by the angular ejector pin and sliding pin so as to be conveniently and smoothly ejected from the injection mold. Therefore, the plastic article does not damaged by the angular ejector pin and further to simplify the manufacturing procedure and reduce the manufacturing cost.

The above-mentioned and other features and objects of this invention and the manner of attaining them will become more apparent and the invention itself will be better understood by reference to the following description of a preferred embodiment of the invention taken in conjunction with the accompanying figures wherein:

DETAILED DESCRIPTION OF THE PREFERRED EMBODIMENT

Figure 1:
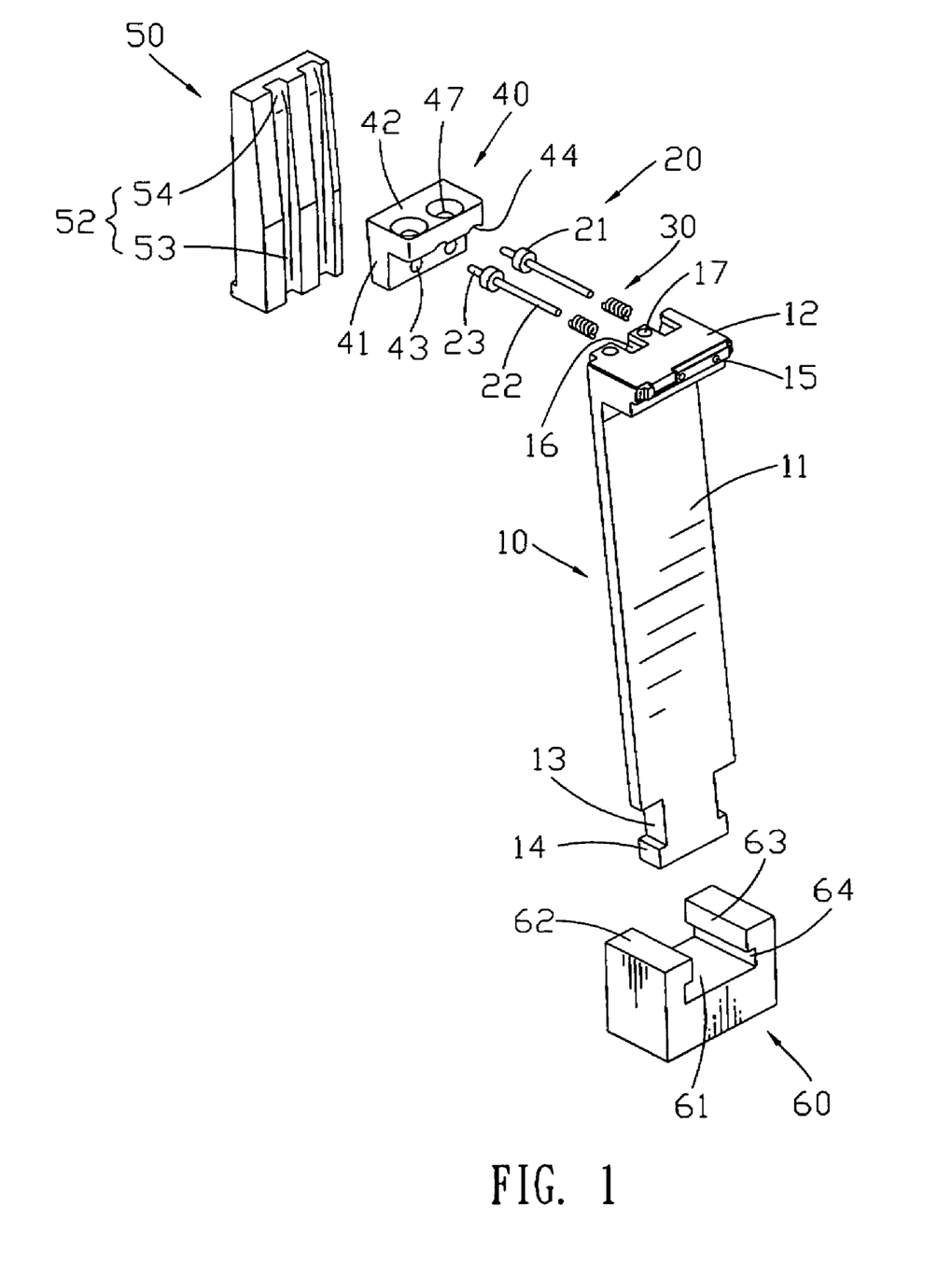
FIG. 1 is an exploded perspective view of an angular ejector mechanism according to the prevent invention.
Figure 2:
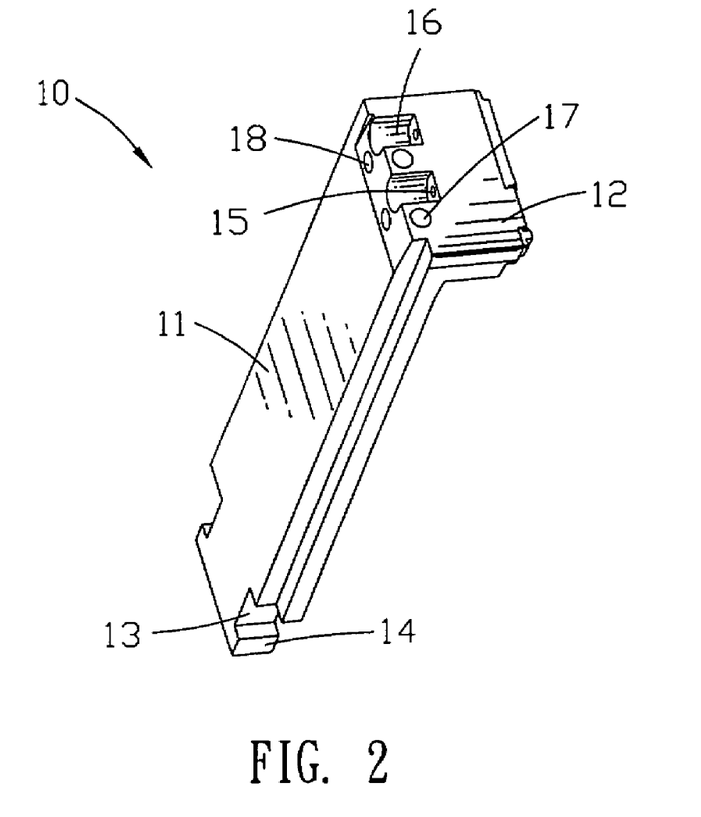
FIG. 2 is a perspective view of an angular ejector pin of the angular ejector mechanism as shown in FIG. 1.
Figure 4:
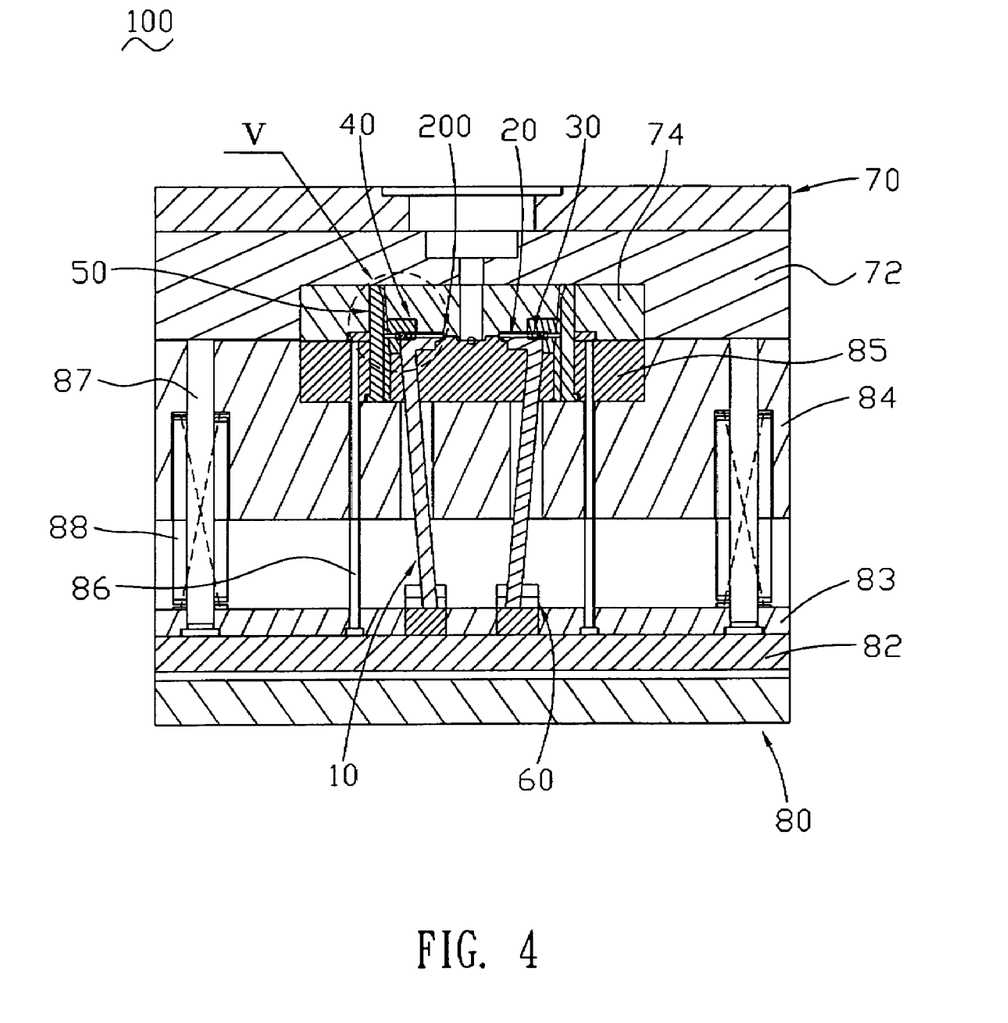
FIG. 4 is a cross-sectional view of an injection mold assembling with the angular ejector mechanism showing the mold closing state.

Referring to FIG. 1, FIG. 2 and FIG. 4, an angular ejector mechanism is mounted in an injection mold 100 for molding a plastic article having a big dimension recess in a inner side and conveniently ejecting the plastic article 200 from the injection mold 100. The angular ejector mechanism comprises an angular ejector pin 10, a sliding pin 20, a pair of elastic element 30, a hell block 40 and a stopping block 50.

Referring to FIG. 2, the angular ejector pin 10 includes a horizontal molding plate 12 and an inclined supporting plate 11 extending downward from a portion of the molding plate 12 at a predetermined angle. Two sliding gaps 13 are defined at a lower portion of lateral sides of the supporting plate 11 and two latching protrusions 14 are shaped below the two sliding gaps 13. The molding plate 12 extends forward from an upper portion of the supporting plate 11. The shape and dimension of a front portion of the molding plate 12 is adapted to the shape and dimension of the recess 210 of the plastic article 200 (shown in FIG. 13). A pair of circular moving hole 15 is defined in a front face of the molding plate 12. A pair of arc sliding grooves 16 is defined in a rear face of the molding plate 12 and extends forward to respectively communicate with the pair of the circular moving hole 15. The diameters of the sliding grooves 16 are larger than the diameters of the moving hole 15, and the sliding grooves 16 are coaxial with the moving holes 15. A pair of fixing hole 17 is defined in the top surface of the molding plate 12 and extends downward, and a pair of locking hole 18 is defined in the rear face of the molding plate 12 below the pair of the sliding groove 15.

Referring to FIG. 1, a pair of sliding pins 20 is assembled with the angular ejector pin 10. Each sliding pin 20 with rod shaped has a circular stopping protrusion 21 protruded from a rear portion of the sliding pin 20. The shape and dimension of the stopping protrusion 21 is adapted to the shape and dimension of the sliding groove 16 so as to slide there through. The stopping protrusion 21 divides the sliding pin 20 to a moving portion 22 before the stopping protrusion 21 and a sliding portion 23 behind the stopping protrusion 21, both the cross-sections of the moving portion 22 and the sliding portion 23 are circular shape.

A pair of springs is functioned as elastic elements 30 and assembled with the moving portion 22 of the sliding pin 20. In this embodiment to this present invention, the springs are a pair of helical compression springs. A portion of each spring 30 abuts against the stopping protrusion 21 of the sliding pin 20 and the other portion abuts against a front wall of the sliding groove 16.

Figure 3:
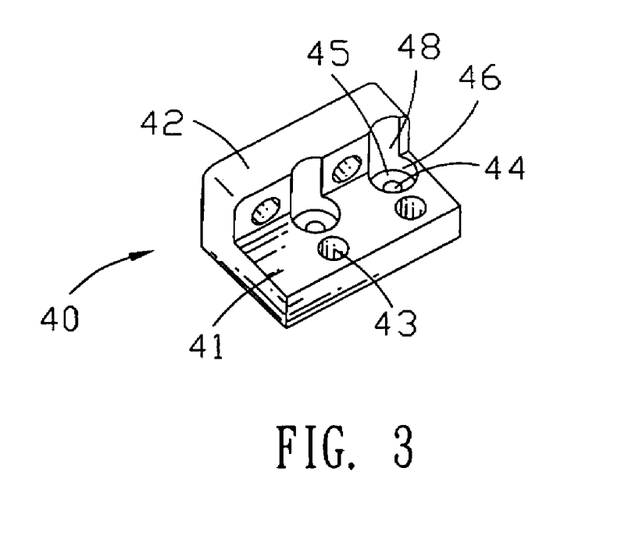
FIG. 3 is a perspective view of a hell block of the angular ejector mechanism as shown in FIG. 1.

Referring to FIG. 1 and FIG. 3, the hell block 40 has a longitudinal block 41 and a horizontal block 42 extending forward from a portion of the longitudinal block 41. A pair of receiving holes 46 is defined in a front face of the longitudinal block 41. A pair of through holes 44 is defined in a rear face of the horizontal block 42 and extends forward to respectively communicate with the pair of receiving hole 46. The pair of through holes 44 is coaxial with the receiving hole 46, and the diameter of the through holes 44 is smaller than the diameter of the receiving hole 46, so that a rear wall of the receiving hole 46 shapes a shoulder 45. The moving portions 22 pass through the receiving holes 46 and the through holes 44, thus, the stopping protrusions 21 slides in/out from the receiving holes 46 so as to be blocked by the shoulder 45. A pair of assembling holes 43 is defined in the front surface of the longitudinal block 41 below the receiving hole 46 corresponding to the locking hole 18 of the angular ejector pin 10, and a pair of circular latching hole 47 downwardly penetrates the horizontal block 42. A pair of latching groove 48 is defined in a bottom face of the horizontal block 42. The latching grooves 48 extend rearward to communicate with the receiving holes 46. The latching grooves 48 combine with the sliding grooves 16 of the angular ejector pin 10 to define a pair of sliding holes so as to allow the stopping protrusion 21 of the sliding pin 20 to slide forward and rearward there through. And the shapes and dimensions of the holes defined by the latching grooves 48 and the sliding grooves 16 are adapted to the shapes and dimensions of the stopping protrusion 21 of the sliding pin 20.

Referring to FIG. 1, the stopping block 50 is a vertical block and extends longitudinally, a pair of sliding channels 52 is defined in a front face of the stopping block 50 and extends longitudinally thereof. Each sliding channel 52 includes a vertical channel 53 locating at a lower portion and an inclined channel 54 extending slantingly relates to the vertical channel 53 at a predetermined angle and locating at an upper portion of the sliding channel 52. The inclined channel 53 is inclined with a predetermined angle relates to the vertical channel 53.

The angular ejector mechanism is assembled with a base 60 so as to be assembled in the injection mold. The base 60 includes a base plate 61 and two supporting arms 62 extending upward from lateral sides of the base plate 61. Two sliding rails 63 are respectively protruded on inner sides of upper portions of the two supporting arms 62, and two sliding troughs 64 are defined in the inner sides of lower portions of the two supporting arms 62 located below the two sliding rails 63.

Referring to FIG. 4, the angular ejector mechanism is mounted in the injection mold 100. In this embodiment, a pair of the angular ejector pin mechanisms is assembled in the injection mold 100. That is to say, the injection mold 100 has two mold cavities.

The injection mold 100 comprises an upper clamping plate 70 and a lower clamping plate 80. A cavity plate 72 is assembled below the upper clamping plate 70 and a core plate 84 is assembled above the lower clamping plate 80. A cavity insert 74 is disposed in the cavity plate 72 and a core insert 85 is disposed in the core plate 84. The cavity insert 74 and the core insert 85 are combined to define mold cavities while the cavity plate 72 and the core plate 84 are closed together. An upper ejector plate 83 and a lower ejector plate 82 are fixed together. The core plate 84 and the lower clamping plate 80 define a moving space so as to provide a space for the upper and lower ejector plate 83, 82 to move up and down therebetween. Ejector pins 86 pass through the upper ejector plate 83 and fixed to the lower and upper ejector plates 82, 83. A pair of guiding pin 87 is fixed to the upper and lower ejector plate 83, 82 and pass through the core plate 84 so as to guide the upper and lower ejector plate 83, 82 to move up and down, and a pair of springs is assembled on the guiding pins 87 for providing restoring forces.

Figure 5:
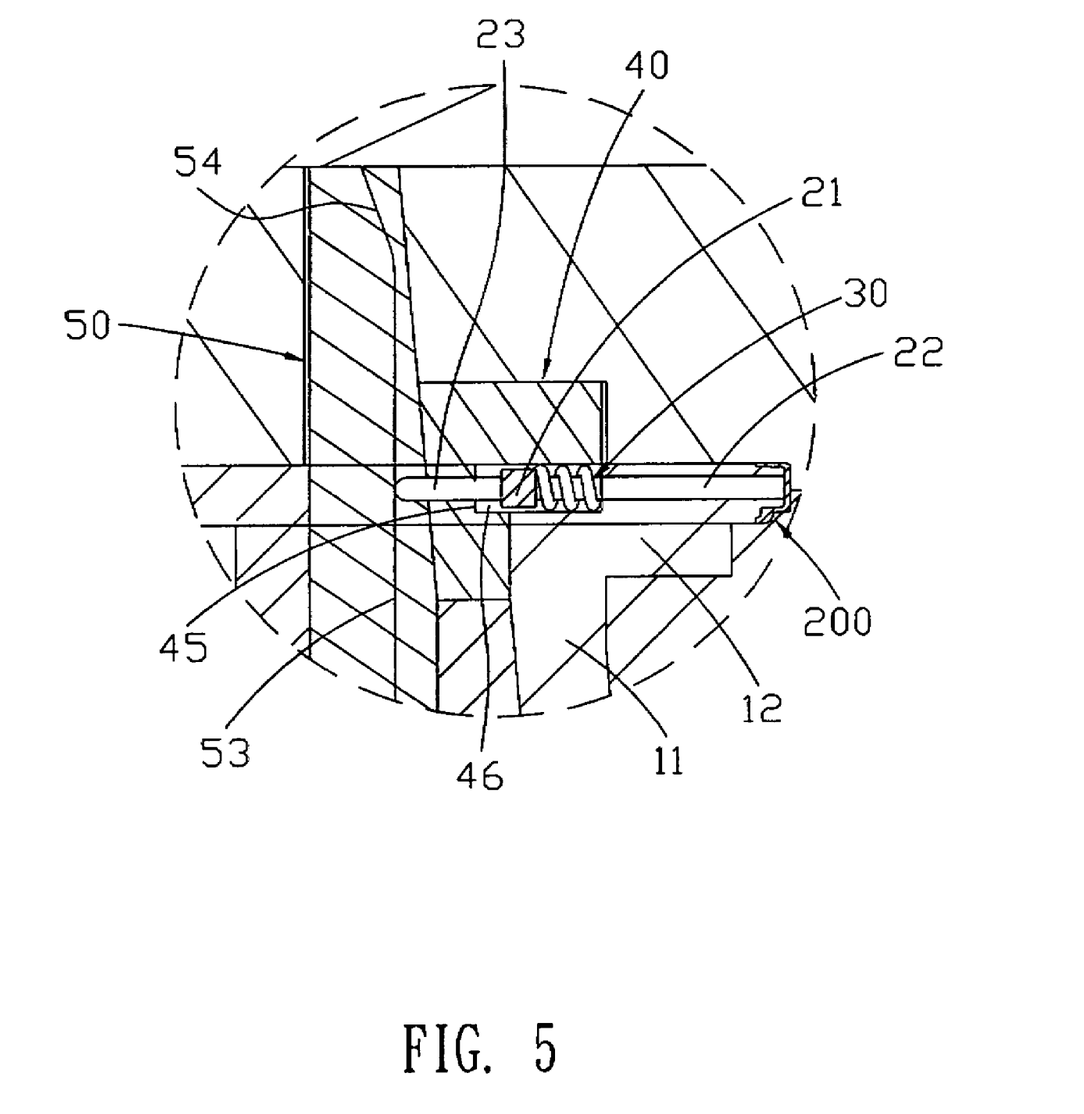
FIG. 5 is a partially enlarged cross-sectional view of the encircled portion marked V in FIG. 4.

Referring to FIGS. 3 and 5, the hell block 40 is assembled in the core insert 85, the pair of helical compression spring is respectively assembled on the moving portions 22 of the sliding pins 20. The moving portions 22 pass through the moving holes 15 and front faces of the moving portions 22 are flush with the front face of the molding plate 12. The sliding portions 23 pass through the receiving holes 46 and the through holes 44 of the hell block 40 so as to abut against inner walls of the vertical channel 54. The assembling holes 43 of the hell block 40 align with the locking holes 18 and fix to the rear face of the molding plate 12 of the angular ejector pin 10 with a bolt. The latching holes 47 align with the fixing holes 17 and the horizontal section 42 are fixed to a top face of the molding plate 12 with bolts. The supporting plate 11 slantingly passes though the core plate 84 and the core insert 85, the latching protrusions 14 are respectively disposed in the sliding troughs 64 of the base 60 and the sliding rails 63 are disposed in the sliding gaps 13. The base 60 is fixed to the upper and lower ejector plate 83, 82 so as to assemble the angular ejector pin 10 in the injection mold 100. Thus, the supporting plate 11 slide relates to the base 60 while the angular ejector pin 10 move up and down following the movement of the upper and lower ejector plates 83, 82.

Referring to FIG. 4 and FIG. 5, the injection mold 100 is closed, the molding plate 12 is disposed in the mold cavity of the injection mold 100. Molten plastics are injected into the mold cavity to mold the plastic article 200. The front portion of the molding section 12 is disposed in the recess 210 of the plastic article 200 so as to mold the recess 210. The ejector pin 86 with flat cross-section abuts against a bottom face of the plastic article 200.

Figure 6:
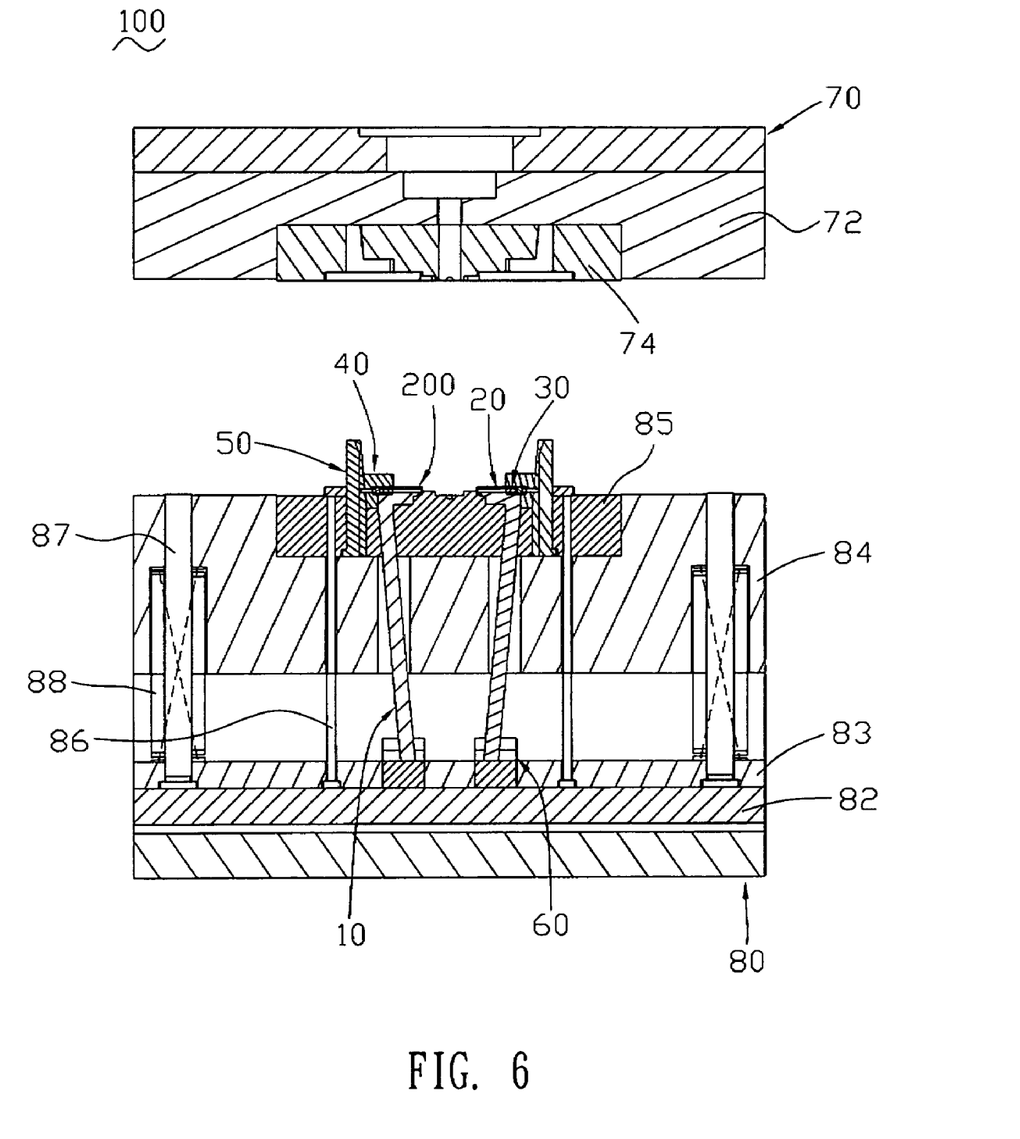
FIG. 6 is a cross-sectional view illustrating the injection mold assembling with the angular ejector mechanism in an opening state.

Referring to FIG. 6, while the injection mold 100 opening, the core plate 84 separates from the cavity plate 72, so the cavity insert 74 and the core insert 85 separate from each other, and upper portions of the stopping block 50 and the hell block 40 reveal outside of the core insert 85.

Figure 7:
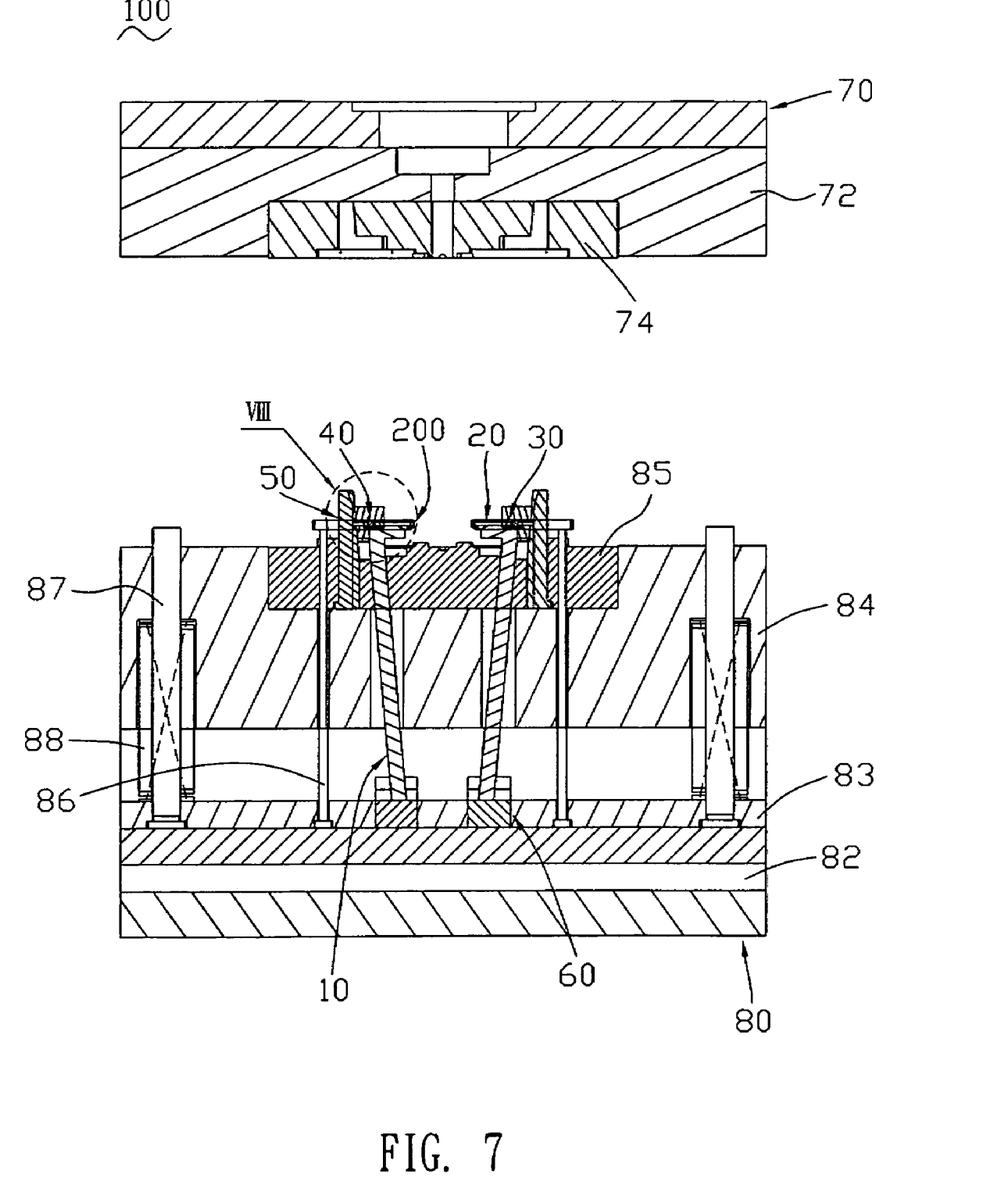
FIG. 7 is a cross-sectional views illustrating the injection mold in the opening state wherein a sliding portion of a sliding pin slides in a vertical channel of a stopping block.
Figure 8:
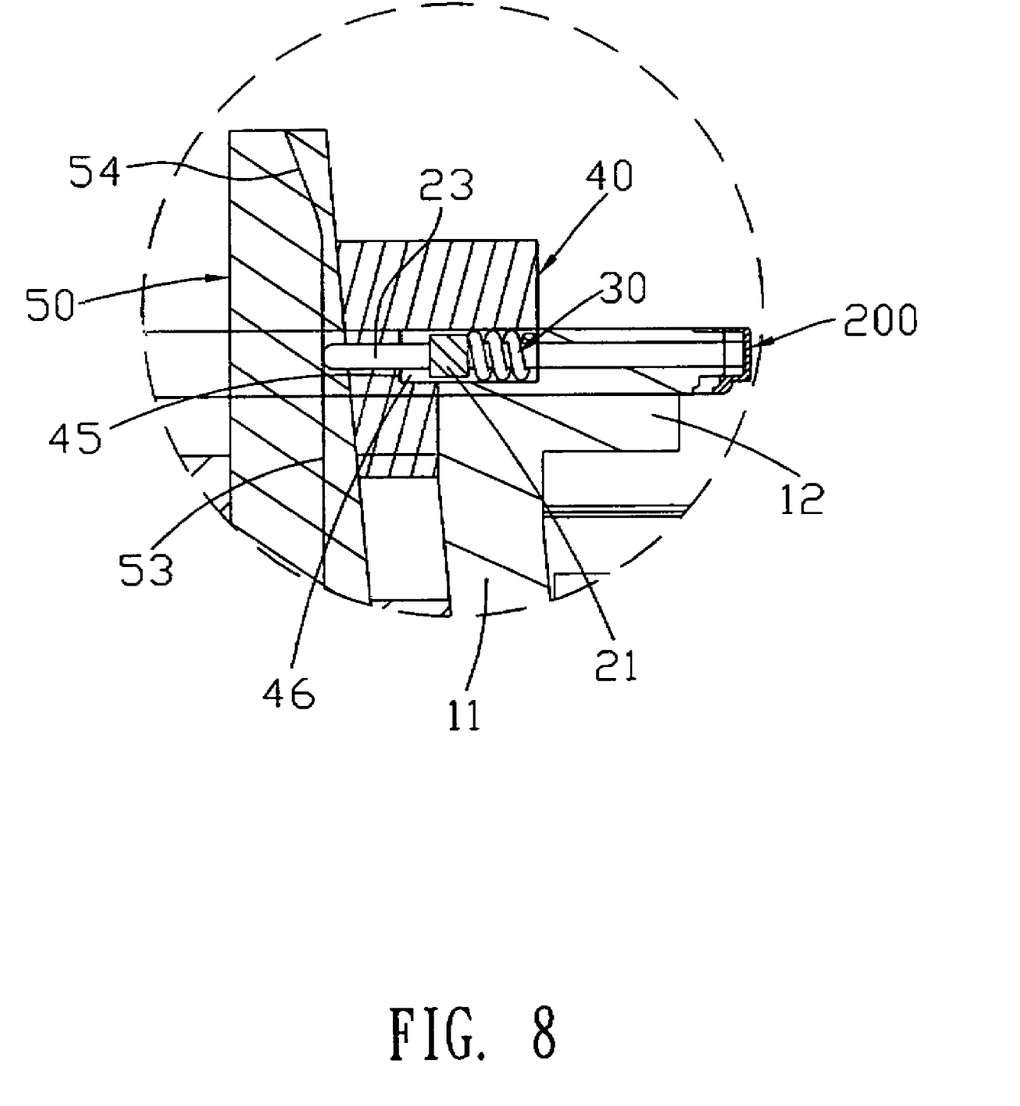
FIG. 8 is a partially enlarged cross-sectional view of the encircled view marked VIII in FIG. 7.

Referring to FIG. 7 and FIG. 8, the upper and lower ejector plates 83, 82 move upward to drive the angular ejector pin 10 to move upward. The supporting plate 11 passes through the core insert 85 at a predetermined angle and the core insert 85 abuts against the supporting block 11. While the angular ejector pin 10 moving upward, the core insert 85 does not move and abuts against the supporting block 11 to force the angular ejector pin 10 move along an inclined path at an angle. That is to say, the moving path of the angular ejector pin 10 is an inclined path. Two ends of each sliding pin 20 respectively abut against the inner wall of the vertical channel 52 and the inner wall of the recess 210 of the plastic article 200. So the sliding pin 20 and the plastic article 200 move upward along the vertical channel 53, the sliding pin 20 and the plastic article 200 do not move at the horizontal direction, but the angular ejector pin 10 move at an angle relates to the core insert 85 so as to produce a horizontal displacement, thus, the angular ejector pin 10 apart from the plastic article 200 at horizontal direction. At the same time, the front walls of the sliding grooves 16 abut against the helical compression springs which are assembled on the moving portion 22 of the sliding pin 20 so as to press the spring 30 and the helical compression springs store elastic energies. While the upper and lower ejector plates 83, 82 drive the angular ejector pin 10, the ejector pin 86 and the guiding pin 87 reveal outside of the core plate 84, and the ejector pin 86 abuts against the bottom surface of the plastic article 200.

Figure 9:
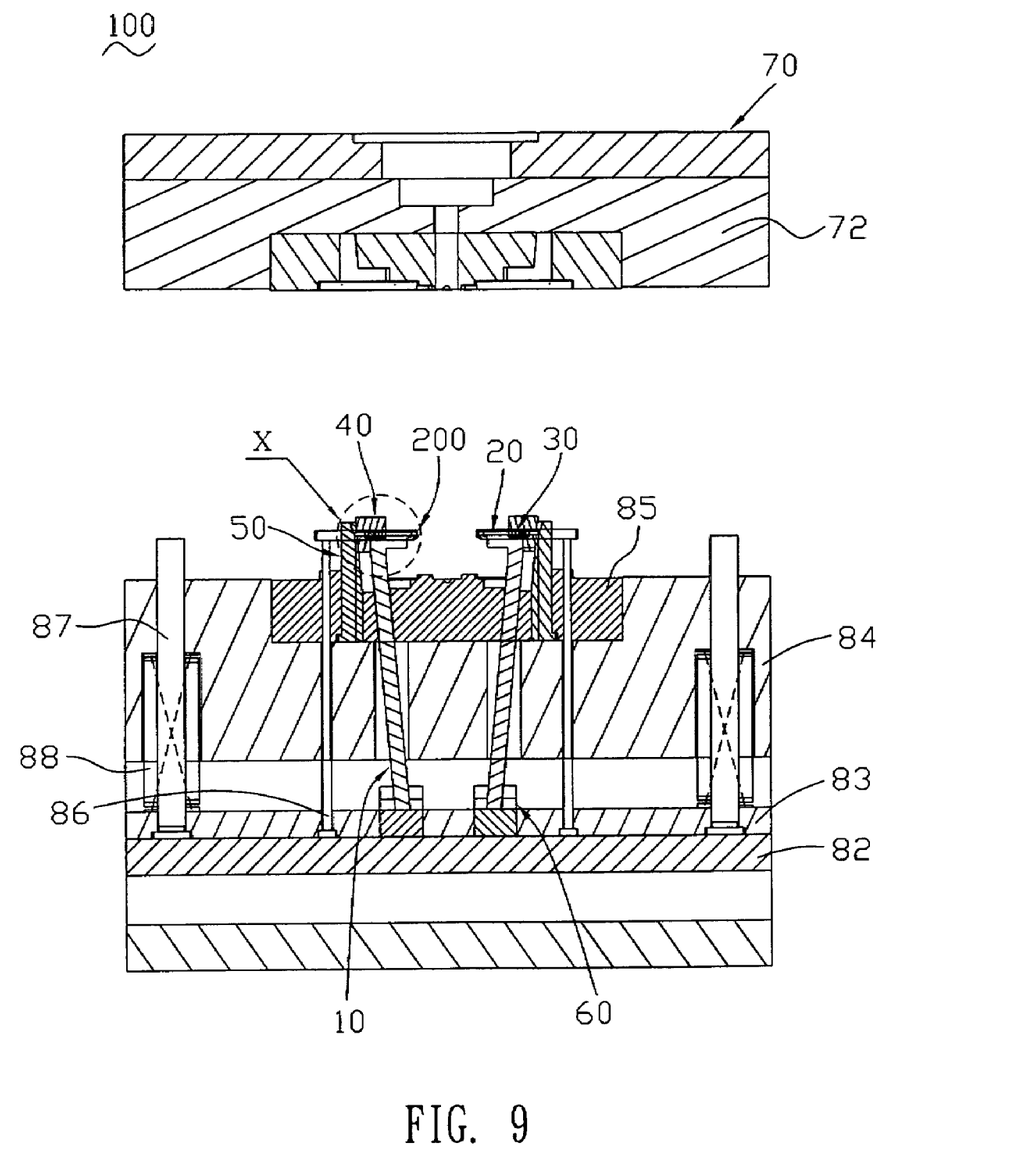
FIG. 9 is a cross-sectional views illustrating the injection mold in the opening state wherein the sliding portion of the sliding pin slides to adjacent position between a vertical channel and a inclined channel of the stopping block.
Figure 10:
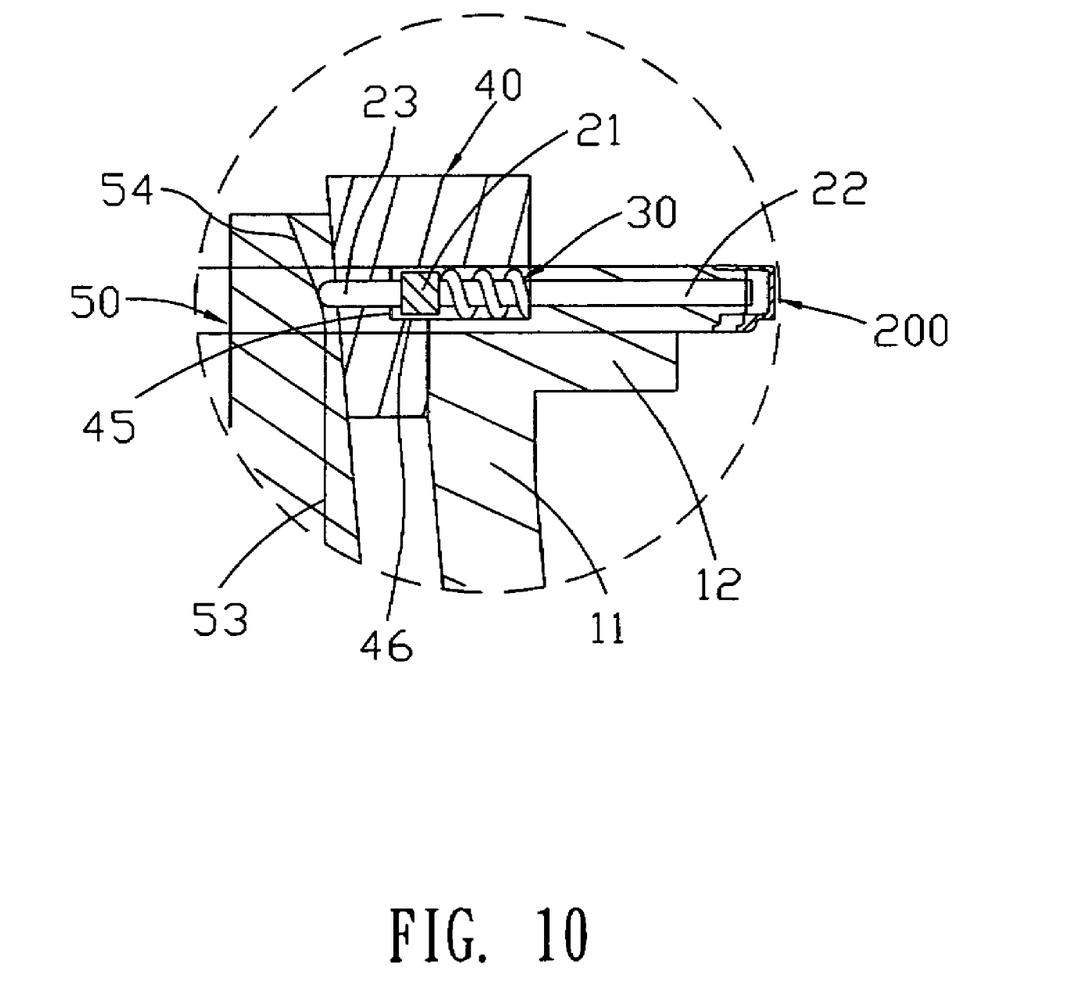
FIG. 10 is a partially enlarged cross-sectional view of the encircled view marked X in FIG. 9.

Referring to FIG. 9 and FIG. 10, while the sliding pin 20 slides to a adjacency position between the vertical channel 53 and the inclined channel 54, and the front portion of the molding plate 12 has exited the recess 210 of the plastic article 200, a distance at horizontal direction between inner walls of the sliding channels 52 and inner walls of the recess 210 increases, that is to say, the horizontal moving displacement of the sliding pin 20 increases, and the stored elastic energies of the helical compression spring enforce the sliding pin 20 to move towards the sliding channel 52, thus the sliding portions 23 of sliding pins conveniently slide into the inclined channel 54, and the horizontal moving distance of the ejector pin 20 gradually increase while the angular ejector pin 10 continues to move upward, so that the moving portions 22 deviate from the recess 210 of the plastic article 200 gradually.

Figure 11:
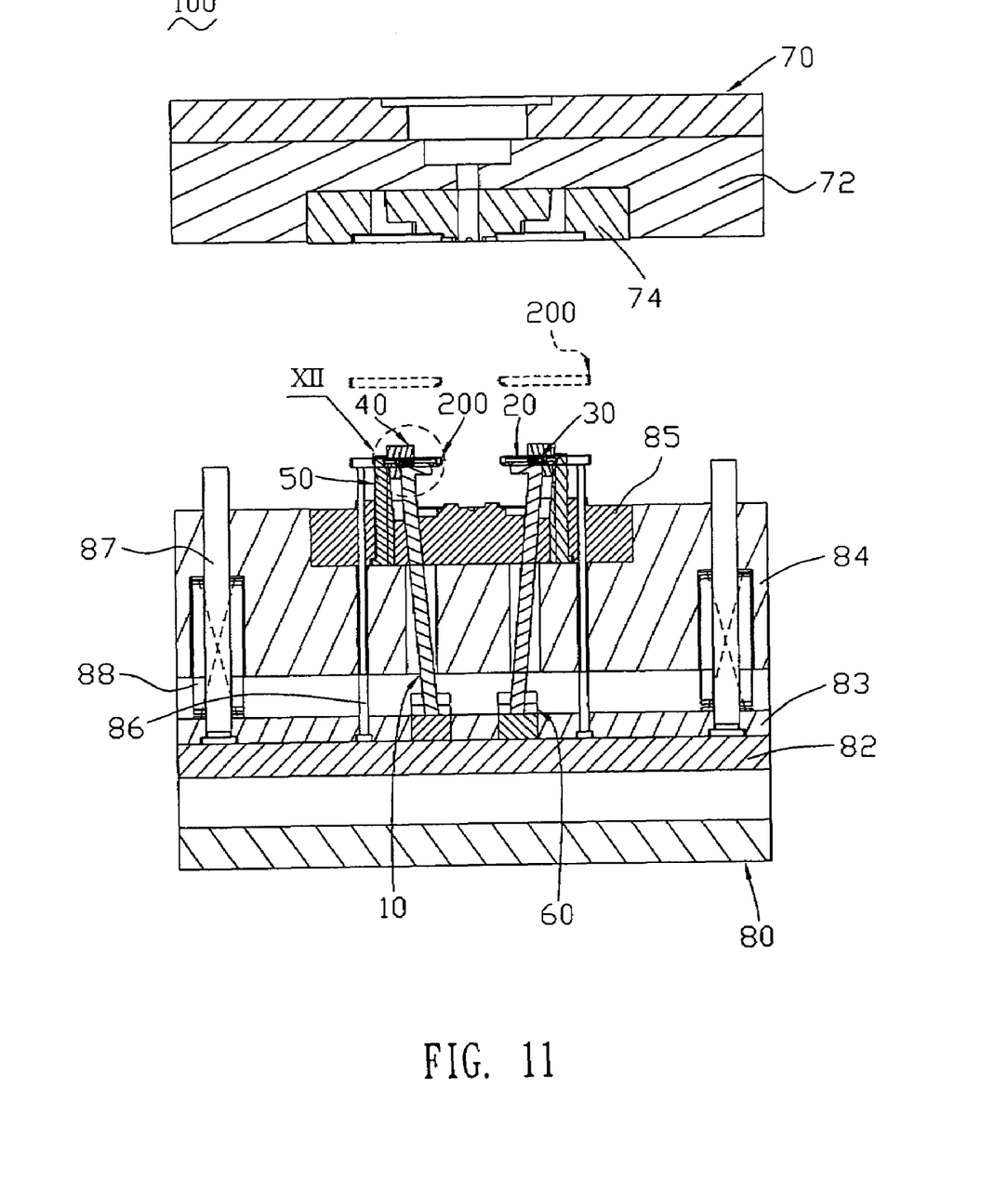
FIG. 11 is a cross-sectional views illustrating the injection mold in the opening state wherein a plastic article being ejected from the injection mold.
Figure 12:
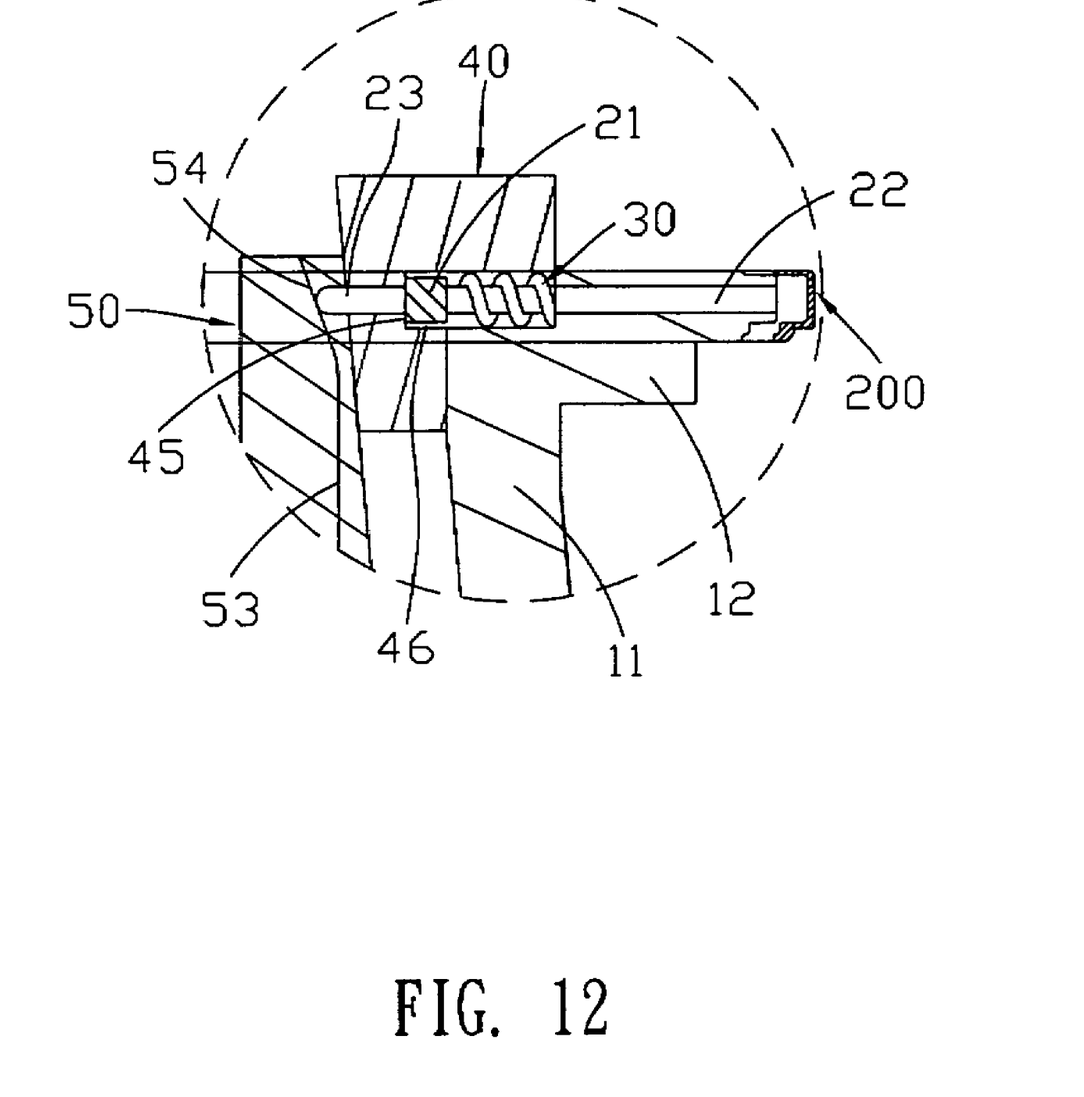
FIG. 12 is a partially enlarged cross-sectional view of the encircled portion marked XII in FIG. 11.

Referring to FIG. 11 and FIG. 12, the angular ejector pin 10 continues to move upward so as to drive the sliding portions 23 of the sliding pins 20 abut against inner walls of the inclined channel 54 and move upward. The moving portions 22 of the sliding pins 20 move towards the inclined channel 54 thus to deviate from the recess 210 of the plastic article 200 until the moving portions of the sliding pins 20 exit the recess 210. At the same time, the angular ejector pin 10 achieves the farthest moving displacement, and the shoulders 45 prevent the stopping protrusions 21 of the sliding pin 20 from further moving forward, so the sliding pin 20 cannot move towards the stopping block 50. The sliding portions 23 of the sliding pins 20 slide to upmost portions of the inclined channels 54. And the upper and lower ejector plates 83, 82 drive the ejector pin 86 move upward so as to eject the plastic article 200 to separate from the angular ejector pin 10 smoothly and conveniently. The guiding pins 87 are driven by the upper and lower ejector plates 83, 82 to a final position, the molding opening cycle is over.

As describe above, while the sliding portions 23 of the sliding pins 20 abut against inner walls of the sliding channels 52 and slide in the vertical channels 54, the moving portions 22 abut against the recess 210 of the plastic article 200, so the plastic article 200 gradually separates from the angular ejector pin 10 at horizontal direction while the angular ejector pin 10 slantingly move at a predetermined inclined angle but the sliding pin 20 did not move in horizontal direction. While the sliding portions 23 slide into the inclined channels 54, the helical compression springs 30 abut against the sliding pins 20 so as to force the sliding pins 20 further slide into the inclined channels 54, and the horizontal displacement of the ejector pin increases so as to separate from the plastic article 200 until the angular ejector pin 10 parting from the plastic article 200. So the plastic article 200 did not interfere by the angular ejector pin 10, then the ejector pin 86 move upward following the upper and lower ejector plates 83, 82 so as to eject the plastic article smoothly and conveniently.

Compared to the prior art, the angular ejector pin 10 assembled with sliding pins 20 help the angular ejector pin 10 deviating from the plastic article 200 and finally separating from the plastic article 200, then the ejector pin 20 exit the plastic article 200, so that there is not existed interference forces between the plastic article 200 and the angular ejector pin 10, and the ejector pin 86 ejects the plastic article 200 smoothly without damage the plastic article, and furthermore, to simplify the molding process and reduce the manufacture cost because the plastic article 200 automatically parts from the angular ejector pin 10 without by hand.

Accordingly, there has been disclosed an angular ejector mechanism and an injection mold assembling with the angular ejector pin mechanism. While an illustrated embodiment of this invention has been disclosed herein, it is understood that various modifications and adaptations to the disclosed embodiment are possible, and it is intended that this invention be limited only by the scope of the appended claims.

What is claimed is:

1. An angular ejector pin mechanism for ejecting plastic articles comprising:
    an angular ejector pin including a horizontal molding plate and an inclined supporting plate slantingly extending downward from a portion of the molding plate, a pair of moving holes defined in a front face of the molding plate and a pair of sliding grooves defined in a rear face of the molding plate and extending forward to communicate with the moving holes, the sliding groove being coaxial with the pair of the moving holes and the diameters of the sliding groove being larger than the diameters of the moving holes;
    a sliding pin having a stopping protrusion so as to divide the sliding pin into a moving portion before the stopping protrusion and a sliding portion behind the stopping protrusion;
    an elastic element assembling with the moving portion of the sliding pin, a portion of each elastic element abutting against the stopping protrusion and the other portion abutting against a front wall of the sliding groove; and
    a stopping block extending longitudinally, a sliding channel defined in a front face of the stopping block and extending longitudinally, the sliding channel including a vertical channel located at a lower portion of the sliding channel and a inclined channel extending slantingly relates to the vertical channel and located at an upper portion of the sliding channel;
    wherein the moving portion of the sliding pin is received in the moving hole and the sliding portion abuts against an inner wall of the sliding channel to slide up and down, the stopping protrusion of the sliding pin moves along the sliding groove of the angular ejector pin.

2. The angular ejector mechanism as claimed in claim 1, further comprising a hell block, the hell block including a longitudinal block and a horizontal block extending from a portion of the longitudinal block, the longitudinal block fixed to a rear face of the molding plate and the horizontal block fixed to a top face of the molding plate, a receiving hole defined in a front face of the longitudinal block, a through hole defined in a rear face of the longitudinal block and extending forward to communicate with and coaxial with the receiving hole, and the diameter of the receiving hole being larger than the diameter of the through hole so that rear wall of the receiving hole shaping a shoulder, the sliding portion of the sliding pin passes through the receiving hole and the through hole, and the stopping protrusion moving in/out from the receiving hole to be blocked by the shoulders.

3. The angular ejector pin mechanism as claimed in claim 2, wherein the moving hole is arc shaped, an arc latching groove is defined in a bottom face of the horizontal block to combine with the moving holes thus to define a sliding hole for the stopping protrusion sliding therein.

4. The angular ejector mechanism as claimed in claim 1, wherein the stopping protrusion is circular shaped and protruded adjacent to a rear portion of the sliding pin.

5. The angular ejector mechanism as claimed in claim 1, wherein the elastic element is a helical compression spring.

6. An injection mold for molding plastic article with a recess in an inner side and ejecting the plastic article out from the injection mold, comprising:
    a cavity plate with a cavity insert disposed in the cavity plate;
    a core plate with a core insert disposed in the core plate;
    an upper ejector plate and a lower ejector plate; and
    an angular ejector mechanism for parting the plastic article from the injection mold, the angular ejector pin mechanism comprising:
    an angular ejector pin including a horizontal molding plate and an inclined supporting plate slantingly extending downward from a portion of the molding plate, a pair of moving holes defined in a front face of the molding plate and a pair of sliding grooves defined in a rear face of the molding plate and extending forward to communicate with the moving holes, the sliding groove being coaxial with the pair of the moving holes and the diameters of the sliding groove being bigger than the diameters of the moving holes;
    a sliding pin having a stopping protrusion so as to divide the sliding pin into a moving portion before the stopping protrusion and a sliding portion behind the stopping protrusion;
    an elastic element assembling with the moving portion of the sliding pin, a portion of each elastic element abutting against the stopping protrusion and the other portion abutting against a front wall of the sliding groove; and
    a stopping block extending longitudinally, a sliding channel defined in a front face of the stopping block and extending longitudinally, the sliding channel including a vertical channel located at a lower portion of the sliding channel and a inclined channel slantingly extending relates to the vertical channel and located at an upper portion of the sliding channel;
    wherein the moving portion of the sliding pin is received in the moving hole and the sliding portion abuts against an inner wall of the sliding channel to slide up and down, and the stopping protrusion of the sliding pin moves along the sliding groove of the angular ejector pin,
    wherein the supporting plate slantingly passes through the core insert and core plate to be mounted in the upper and lower ejector plates, further the cavity plate and core plate are closed together to define a mold cavity for molding the plastic articles,
    wherein a front portion of the molding plate of the angular ejector pin is disposed in the mold cavity to mold the recess in inner side of the plastic article and the angular ejector pin moves up and down following the ejecting movement of the upper and lower plates to eject the plastic article while the while the cavity plate and core plate opening.

7. The injection mold as claimed in claim 6, further comprising a base fixed in the upper ejector plate, the base having a base plate and two supporting arms extending upward from two lateral sides of the base plate, two sliding rails are respectively protruded on inner sides of upper portions of the two supporting arms, and two sliding troughs defined in the inner sides of lower portions of the two supporting arms located below the two sliding rails, two sliding gaps defined at a lower portion of lateral sides of said supporting plate and two latching protrusions shaped below the two sliding gaps, the sliding rails disposed in the sliding gaps and the latching protrusions respectively disposed in the sliding troughs of the base to slide therein.

8. The injection mold as claimed in claim 7, wherein said elastic element is a helical compression spring.

9. The injection mold as claimed in claim 7, further comprising a hell block, the hell block includes a longitudinal block and a horizontal block extending from a portion of the longitudinal block, the longitudinal block fixed to the rear face of the molding plate and the horizontal block fixed to a top face of the molding plate, a receiving hole defined in a front face of the longitudinal block, a through holes defined in a rear face of the longitudinal block and extending forward to communicate with and be coaxial with the pair of the receiving hole, and the diameter of the receiving hole bigger than the diameter of the through hole so that a rear wall of the receiving hole shaping a shoulder, the sliding portion of the sliding pin passing through the receiving hole and the through hole and the stopping protrusion moving in/out from the receiving hole to be blocked by the shoulder.

10. The injection mold as claimed in claim 9, wherein said moving hole is arc shaped, an arc latching groove is defined in a bottom face of the horizontal block and combines with the moving hole to define a sliding hole for the stopping protrusion sliding therein.

* * * * *